(12) United States Patent
Lee

(10) Patent No.: US 11,186,220 B2
(45) Date of Patent: *Nov. 30, 2021

(54) ACTUATOR AND HEAD LAMP COMPRISING SAME

(71) Applicant: LG INNOTEK CO., LTD., Seoul (KR)

(72) Inventor: Jin Seob Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,366

(22) Filed: Nov. 25, 2020

(65) Prior Publication Data

US 2021/0078481 A1 Mar. 18, 2021

Related U.S. Application Data

(63) Continuation of application No. 16/463,648, filed as application No. PCT/KR2017/013407 on Nov. 23, 2017, now Pat. No. 10,875,446.

(30) Foreign Application Priority Data

Nov. 23, 2016 (KR) .................. 10-2016-0156833
Dec. 1, 2016 (KR) .................. 10-2016-0162877

(51) Int. Cl.
*B60Q 1/06* (2006.01)
*B60Q 1/068* (2006.01)
(Continued)

(52) U.S. Cl.
CPC ........... *B60Q 1/0683* (2013.01); *B60Q 1/076* (2013.01); *F16H 25/20* (2013.01); *H02K 7/08* (2013.01); *H02K 7/108* (2013.01); *H02K 11/215* (2016.01)

(58) Field of Classification Search
CPC ..... B60Q 1/0683; B60Q 1/076; H02K 11/215
See application file for complete search history.

(56) References Cited

U.S. PATENT DOCUMENTS

| 2001/0029782 | A1‡ | 10/2001 | Articolo | .................. G01F 23/46 |
| | | | | 73/314 |
| 2004/0057243 | A1‡ | 3/2004 | Takii | ........................ B60Q 1/12 |
| | | | | 362/51 |

(Continued)

FOREIGN PATENT DOCUMENTS

| DE | 20 2008 007470 | 9/2008 |
| JP | 2004-343987 | 12/2004 |

(Continued)

OTHER PUBLICATIONS

International Search Report (with English Translation) and Written Opinion dated Feb. 27, 2018 issued in Application No. PCT/KR2017/013407.

(Continued)

*Primary Examiner* — Anne M Hines
(74) *Attorney, Agent, or Firm* — Ked & Associates, LLP

(57) ABSTRACT

According to the present invention, there may be provided an actuator comprising: a shaft; a rotor surrounding the shaft, a stator arranged outside the rotor a moving portion coupled to the shaft, a housing that holds the shaft and a substrate that is arranged on the housing and comprises a sensor portion for sensing the position of the moving portion, wherein the moving portion comprises a magnet, the sensor portion comprises a first sensor and a second sensor for sensing the amount of magnetic flux change according to the position of the magnet, the first sensor generates a first signal including an area in which a measured voltage increases as the magnet moves away from the first sensor, and the second sensor generates a second signal including an (Continued)

area in which the measured voltage decreases as the magnet moves away from the second sensor.

10 Claims, 14 Drawing Sheets

(51) Int. Cl.
*H02K 11/215* (2016.01)
*B60Q 1/076* (2006.01)
*F16H 25/20* (2006.01)
*H02K 7/08* (2006.01)
*H02K 7/108* (2006.01)

(56) References Cited

U.S. PATENT DOCUMENTS

| 2004/0212341 | A1 | 10/2004 | Yamamoto et al. | |
|---|---|---|---|---|
| 2008/0315821 | A1 | 12/2008 | Chen | |
| 2009/0323367 | A1 ‡ | 12/2009 | Lee | B60Q 1/076 362/46 |
| 2012/0152646 | A1 ‡ | 6/2012 | Lee | B62D 5/0403 180/44 |
| 2013/0175904 | A1 | 7/2013 | Jang et al. | |

FOREIGN PATENT DOCUMENTS

| JP | 2013-195262 | 9/2013 |
|---|---|---|
| JP | 2015-21745 | 2/2015 |
| KR | 10-2004-0025830 | 3/2004 |
| KR | 10-2008-0084614 | 9/2008 |
| KR | 10-2012-0070161 | 6/2012 |
| KR | 10-2014-0016492 | 2/2014 |
| KR | 10-1559924 | 10/2015 |
| WO | WO 2007/113030 | 10/2007 |
| WO | WO 2010/139098 | 12/2010 |

OTHER PUBLICATIONS

European Search Report dated Jun. 26, 2020 issued in Application No. 17873896.9.
U.S. Notice of Allowance dated Sep. 2, 2020 issued in U.S. Appl. No. 16/463,648.
European Communication pursuant to Article 94(3) EPC dated Jul. 1, 2021 issued in Application No. 17873896.9.
Japanese Office Action dated Oct. 19, 2021 issued in Application No. 2019-527529.

‡ imported from a related application

ACTUATOR AND HEAD LAMP COMPRISING SAME

This application is a continuation application of U.S. patent application Ser. No. 16/463,648, filed May 23, 2019, which is a U.S. National Stage Application under 35 U.S.C. § 371 of PCT Application No. PCT/KR2017/013407, filed Nov. 23, 2017, which claims priority to Korean Patent Application No. 10-2016-0156833, filed Nov. 23, 2016, and Korean Patent Application No. 10-2016-0162877, filed Dec. 1, 2016, whose entire disclosures are hereby incorporated by reference.

TECHNICAL FIELD

The present invention relates to an actuator and a head lamp including the same.

BACKGROUND ART

As an actuator, there is an apparatus for converting a rotational motion into a rectilinear motion of a motor. Such an actuator may include a shaft including a thread formed thereon and a moving portion such as a nut screw-coupled to the shaft. The actuator may include a bracket that accommodates the motor and supports the shaft. The bracket may include a bearing that supports a front end of the shaft rotatably.

The moving portion may include a magnet. The actuator may include a sensor that senses the amount of magnetic flux according to the position of the magnet. The sensor is positioned on a substrate under a housing. An initial position of the moving portion considering an application is referred to as a driving origin point. The driving origin point is a criteria for movement of the moving portion. The sensor checks the position of the driving origin point. When the driving origin point is checked, the moving portion is moved with a certain stroke according to rotation of the shaft.

However, when abnormality occurs in the sensor and an error occurs when the driving origin point is checked, the actuator with such a structure has a disastrous effect on the performance of the application connected to the actuator.

Meanwhile, the substrate is coupled to the bracket of the housing. In this case, tolerance occurs. A cover for protecting the substrate is coupled to a lower portion of the substrate. At this time, an accumulated tolerance occurs again. Due to this accumulated tolerance, the precision of the initial position of the moving portion is greatly decreased. Also, the cover is installed so that the size of the actuator is increased. Because the bracket and the cover are coupled to each other using a fixing member such as a screw or bolt, due to an external force such as vibration caused by driving of the actuator, the screw or bolt may be deviated from or apart from the bracket and the cover.

Also, because the actuator uses the substrate, the actuator may include an additional circuit in addition to a circuit connected to the sensor. For example, a capacitor for reducing electromagnetic waves may be further positioned on the substrate, and an additional circuit for attenuating electromagnetic waves may be further configured on the substrate. Thus, production costs may be increased.

DISCLOSURE

Technical Problem

The present invention is directed to providing an actuator that may check the position of a moving portion in addition to the position of a driving origin point in real time, a head lamp including the same, and an actuator control method.

In particular, the present invention is directed to providing an actuator that may inform a user that abnormality occurs in a sensor, a head lamp including the same, and an actuator control method.

In addition, the present invention is directed to providing a printed circuit board (PCB) less-type actuator from which a substrate is removed using a hall-integrated circuit (IC). Thus, the present invention is directed to providing an actuator having a reduced size in which a conventional cover is removed.

The problems to be solved by the present invention are not limited to the above-described problems. Other unmentioned problems will be clearly understood by those skilled in the art from the following description.

Technical Solution

One aspect of the present invention provides an actuator including: a shaft including a thread; a rotor surrounding the shaft; a stator arranged outside the rotor; a moving portion coupled to the thread of the shaft; a housing that holds both ends of the shaft; and a substrate that is arranged on the housing and includes a sensor portion for sensing the position of the moving portion, wherein the moving portion includes a magnet, the sensor portion includes a first sensor and a second sensor for sensing the amount of magnetic flux change according to the position of the magnet, the first sensor generates a first signal including an area in which a measured voltage increases linearly as the magnet moves away from the first sensor, and the second sensor generates a second signal including an area in which the measured voltage decreases linearly as the magnet moves away from the second sensor.

The actuator may further include a controller for controlling movement of the moving portion, wherein the controller may include a determination portion that determines whether the magnet is positioned at a driving origin point based on the first signal and the second signal.

The determination portion may compare the position of the moving portion with the driving origin point when the first signal and the second signal have the same values.

The controller may feedback control so that the moving portion is positioned at the driving origin point.

The actuator may further include a controller connected to the first sensor and the second sensor, wherein the controller may include a storage portion for storing reference voltage data corresponding to the amount of magnetic flux change according to the position of the magnet and a determination portion that compares first measured voltage data measured by the first sensor and second measured voltage data measured by the second sensor with the reference voltage data at the corresponding position of the magnet.

The determination portion may generate a warning signal when a difference value between the first measured voltage data and the reference voltage data exceeds a reference value or a difference value between the second measured voltage data and the reference voltage data exceeds the reference value.

The first sensor and the second sensor may be aligned based on an axial direction of the shaft.

The driving origin point of the moving portion may be between the first sensor and the second sensor in the axial direction of the shaft.

The first sensor and the second sensor may be apart from each other at the same distances from the driving origin point of the moving portion in the axial direction of the shaft.

The housing may include a body and a bracket, and the bracket may be positioned at one side of the shaft, and the body may be positioned at the other side of the shaft.

Another aspect of the present invention provides a head lamp including: an actuator; and a lamp portion connected to the actuator, wherein the actuator includes; a shaft including a thread; a rotor surrounding the shaft; a stator arranged outside the rotor; a moving portion coupled to the thread of the shaft; a housing that holds both ends of the shaft; and a substrate that is arranged under the housing and includes a sensor portion for sensing the position of the moving portion, and wherein the moving portion includes a magnet, the sensor portion includes a first sensor and a second sensor for sensing the amount of magnetic flux change according to the position of the magnet, the first sensor generates a first signal including an area in which a measured voltage increases linearly as the magnet moves away from the first sensor, and the second sensor generates a second signal including an area in which the measured voltage decreases linearly as the magnet moves away from the second sensor.

An axial direction of the shaft of the lamp portion may be perpendicular to an axial direction of the shaft of the actuator.

Another aspect of the present invention provides an actuator control method including: a) determining whether a magnet is positioned at a driving origin point based on a first signal and a second signal; b) when the magnet is positioned at the driving origin point, comparing whether each of first measured voltage data and second measured voltage data is identical to reference voltage data, at a corresponding position of a moving portion; and c) when at least one of the first measured voltage data and the second measured voltage data is not identical to the reference voltage data, warning.

The objective is achieved by an actuator according to another aspect of the present invention, the actuator including: a shaft including a thread; a rotor arranged outside the shaft; a stator, which is arranged outside the rotor and on which a coil is wound; a moving portion coupled to the thread of the shaft and moving along the shaft; a housing that holds both ends of the shaft; and a sensor portion arranged on the housing and sensing the position of the moving portion, wherein the sensor portion includes a hall-integrated circuit (IC) for sensing the position of the moving portion and a lead frame arranged at one side of the hall IC.

The housing may include: a body; and a bracket that extends to protrude from one side of the body, and the rotor, the stator, and one side of the shaft may be positioned inside the body, and the other side of the shaft may be supported by the bracket.

The bracket may include a bottom plate, side plates that protrude from both edges of the bottom plate and a support frame supporting the other side of the shaft, and the housing and the bracket may be integrally formed.

A groove in which the sensor portion is arranged, may be formed in the bottom plate.

The actuator may further include guide portions that protrude from the groove so that the sensor portion is positioned at a predetermined position.

The sensor portion may be thermally fused into the groove of the bottom plate.

The actuator may further include three terminals each having one side connected to the lead frame, wherein the terminal may be positioned on the bottom plate using a press fit or insert injection method.

The lead frame and one side of the terminal may be connected to each other by welding.

The other side of the terminal may be formed as a cylindrical pin and may be disposed to be exposed to an outside of the housing.

Guide projections may be further arranged on an inner surface of the side plates, and the guide projections may be detached from/assembled with guide grooves of the moving portion and may guide movement of the moving portion.

A plurality of grooves for reducing mass of the actuator may be formed in an outer surface of the side plates, and the plurality of grooves for reducing mass of the actuator may have a trapezoidal or reversed trapezoidal shape.

The objective is achieved by a head lamp according to another aspect of the present invention, the head lamp including: an actuator; and a lamp portion connected to the actuator, wherein the actuator includes; a shaft including a thread; a rotor arranged outside the shaft; a stator, which is arranged outside the rotor and on which a coil is wound; a moving portion coupled to the thread of the shaft and moving along the shaft; a housing that holds both ends of the shaft; and a sensor portion arranged on the housing and sensing the position of the moving portion, and wherein the sensor portion includes a hall-integrated circuit (IC) for sensing the position of the moving portion and a lead frame arranged at one side of the hall IC.

An axial direction of a coupling portion that connects the lamp portion to the actuator may be perpendicular to an axial direction of the lead frame of the actuator. One side of the coupling portion may be coupled to a coupling groove formed in the moving portion.

Advantageous Effects

According to one or more embodiments, the position of a moving portion can be checked in real time through two sensors, and signals generated in the two sensors are compared with each other so that abnormality of the sensors can be checked and thus accurate information about a real-time position of the moving portion can be attained.

According to one or more embodiments, a conventional substrate can be removed using a hall-IC. That is, because a material cost of the substrate is 30% of the whole of a material cost of a conventional actuator, the substrate can be removed so that the material cost can be reduced. In addition, a process of coupling the conventional substrate is omitted, production costs can be reduced.

A cover can be removed together with the conventional substrate so that the size of the actuator can be reduced. That is, a compact actuator can be provided. Thus, the structure and assembling process of the actuator can be simplified. Furthermore, the cover is removed together with the conventional substrate, assembly tolerance can be minimized.

In addition, in the case of shielding of electromagnetic waves due to design of patterns and ground applied to the conventional substrate, there is a large probability of change of electromagnetic wave noise generated outwards due to the patterns. However, since a housing of the actuator is provided as an injection molding structure, shielding performance of electromagnetic wave noise can be further improved.

MODES OF THE INVENTION

Hereinafter, exemplary embodiments of the present invention will be described in detail with reference to the attached drawings. Objectives, particular advantages, and new features of the present invention will be more apparent from the following detailed description associated with the attached drawings and exemplary embodiments. The terms or words used in the present specification and the claims should not be interpreted by limiting in general or dictionary senses but should be interpreted in senses and concepts that comply with the technical spirit of the present invention based on the principle that the inventor can define concepts of the terms properly so as to describe his/her own invention in a best manner. In the description of the present invention, a detailed description of related well-known technology that makes the point of the present invention unnecessarily is omitted.

It will be understood that although the terms first and second are used herein to describe various elements, these elements should not be limited by these terms. These terms are only used to distinguish one element from another element. Thus, a second element discussed below could be termed a first element, and similarly, a first element may be termed a second element without departing from the teachings of this disclosure. As used herein, the term "and/or" includes any and all combinations of one or more of the associated listed items.

Figure 1:
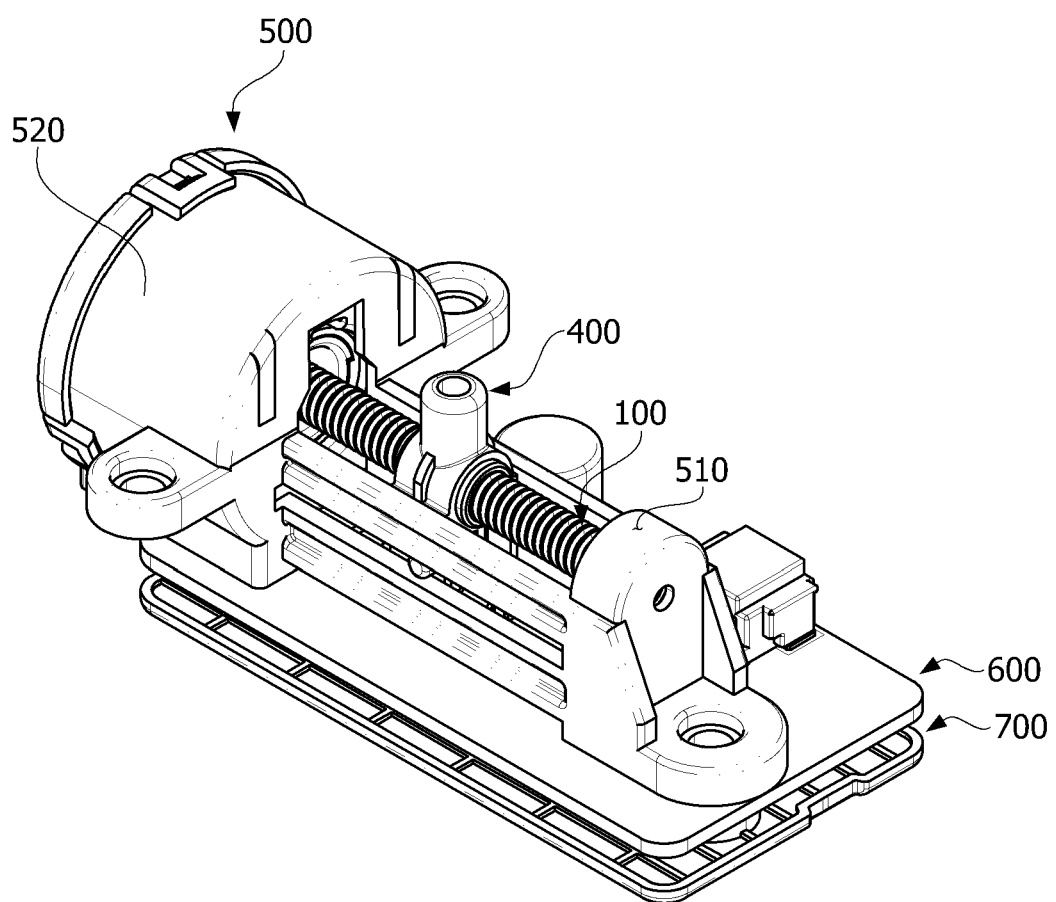
FIG. 1 illustrates an actuator according to an exemplary embodiment of the present invention.
Figure 2:
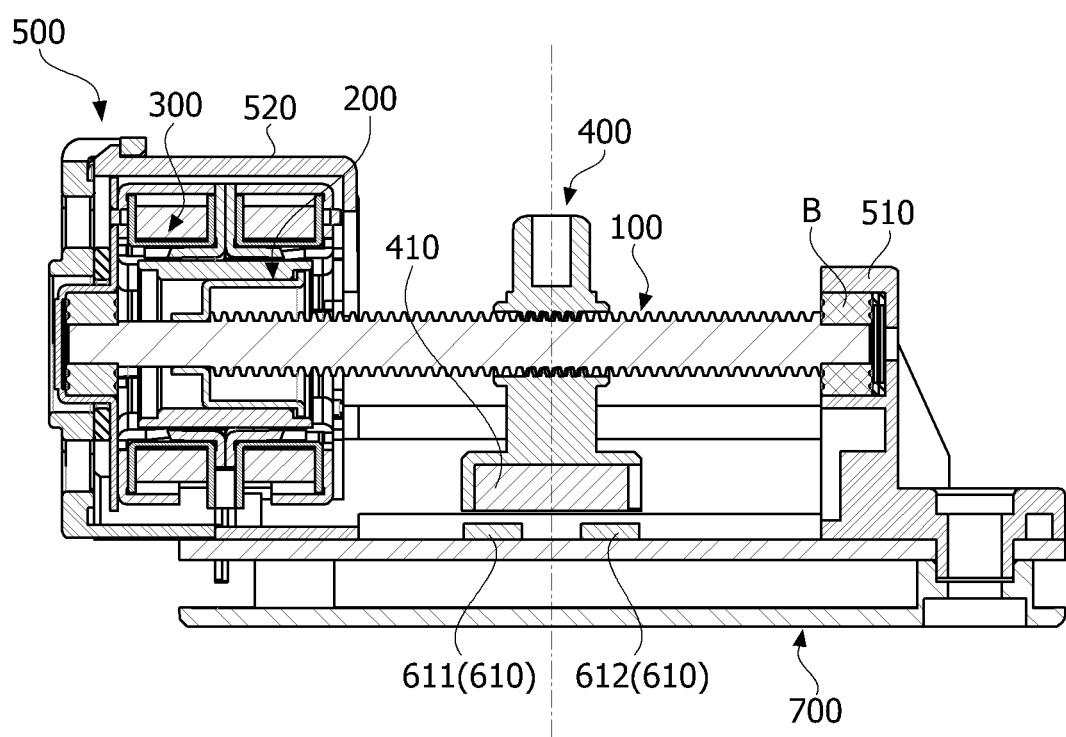
FIG. 2 is a side cross-sectional view of the actuator illustrated in FIG. 1.
Figure 3:
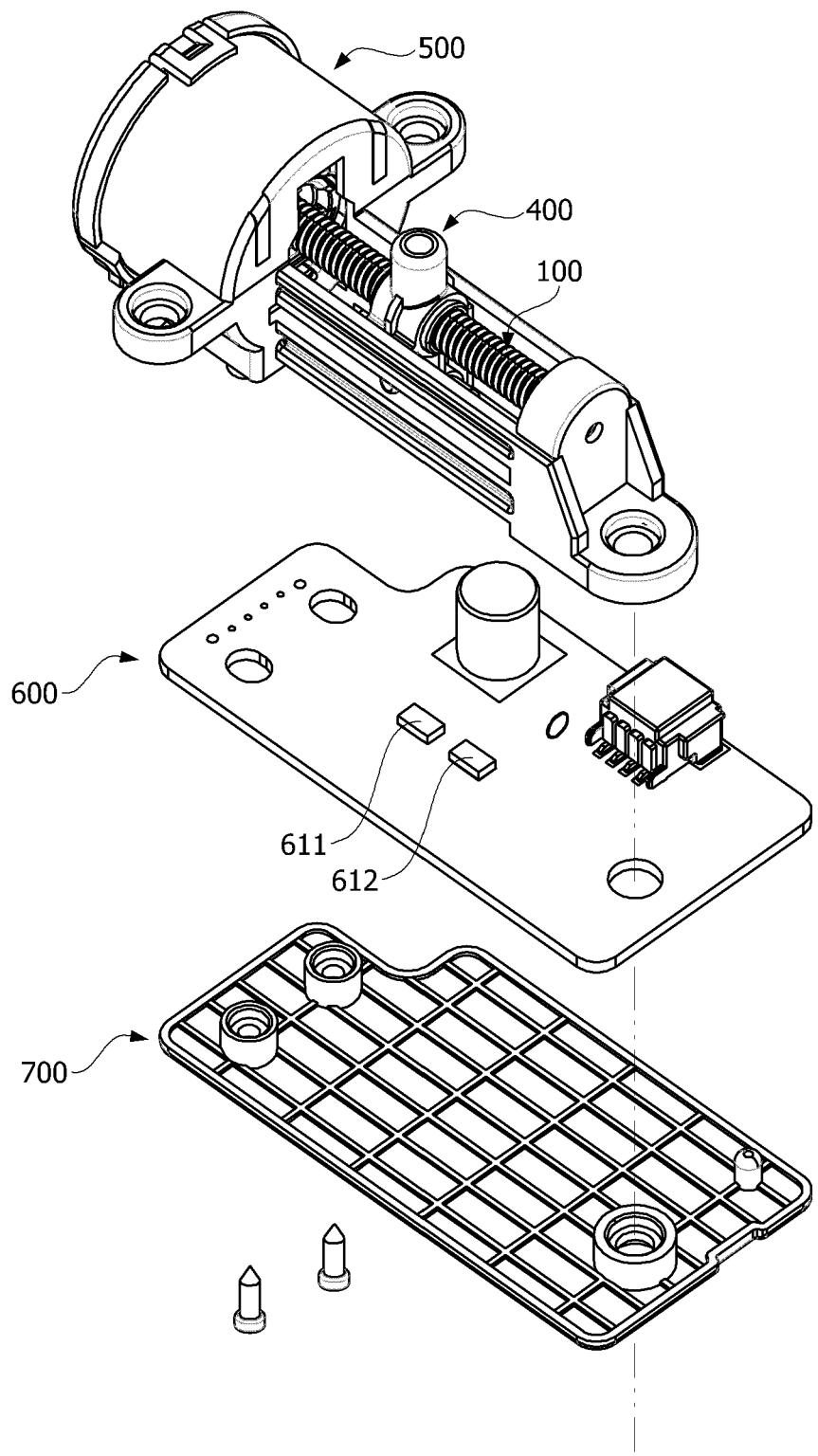
FIG. 3 is an exploded view of the actuator illustrated in FIG. 1.

FIG. 1 illustrates an actuator according to an exemplary embodiment of the present invention, FIG. 2 is a side cross-sectional view of the actuator illustrated in FIG. 1, and FIG. 3 is an exploded view of the actuator illustrated in FIG. 1.

Referring to FIGS. 1 through 3, an actuator may include a shaft 100, a rotor 200, a stator 300, a moving portion 400, a housing 500, a substrate 600, a cover 700, and a controller 800.

The shaft 100 has a thread on an outer circumferential surface thereof. The shaft 100 may pass through the rotor 200 and may be coupled to the rotor 200. A front end of the shaft 100 may be rotatably supported by a bearing B.

The rotor 200 is coupled to the shaft 100. The rotor 200 may be positioned inside the stator 300. The rotor 200 rotates due to a force generated by an electrical interaction with the stator 300. When the rotor 200 rotates, the shaft 100 is rotated.

The stator 300 is positioned outside the rotor 200. A coil may be wound on the stator 300. The coil wound on the stator 300 causes an electrical interaction to induce rotation of the rotor 200.

The moving portion 400 is screw-coupled to the shaft 100. Thus, when the shaft 100 rotates, the moving portion 400 makes a rectilinear motion along the shaft 100. The moving portion 400 may include a magnet 410. The magnet 410 is positioned at a bottom end of the moving portion 400. The magnet 410 may be positioned to be directed downwards.

Meanwhile, the moving portion 400 is a portion to be connected to a mechanical instrument. Here, the mechanical instrument may be a head lamp mounted on a vehicle. In detail, the moving portion 400 may be directly connected to a reflector of the head lamp or indirectly connected to a frame or the reflector of the head lamp via a connection member such as a link. As the moving portion 400 makes a rectilinear reciprocal motion, the head lamp may be leveled with swiveling and may change an irradiation direction of the lamp.

The housing 500 may include a body 510 and a bracket 520. The body 510 is positioned in front of the moving portion 400. The body 510 may include the bearing B. The bearing B supports an end of the shaft 100. The bracket 520 is positioned behind the moving portion 400. The bracket 520 may include some of the rotor 200, the stator 300, and the shaft 100 inside thereof.

The substrate 600 may be coupled to a lower portion of the housing 500. The substrate 600 includes a sensor portion 610. The sensor portion 610 is positioned under the moving portion 400. The sensor portion 610 may be positioned on a movement path of the magnet 410. In this case, the magnet 410 may be a magnet having an N-pole and a S-pole divided based on an axial direction of the shaft 100. When the moving portion 400 moves, the sensor portion 610 senses the amount of magnetic flux change due to the magnet 410. The sensor portion 610 may be a hall-integrated circuit (IC) that changes a change of a magnetic field into a voltage due to a hall effect.

The sensor portion 610 may include a first sensor 611 and a second sensor 612. The first sensor 611 and the second sensor 612 senses the amount of magnetic flux change due to the position of the magnet 410 and may output a voltage in response to the sensed amount of magnetic flux change.

Figure 4:
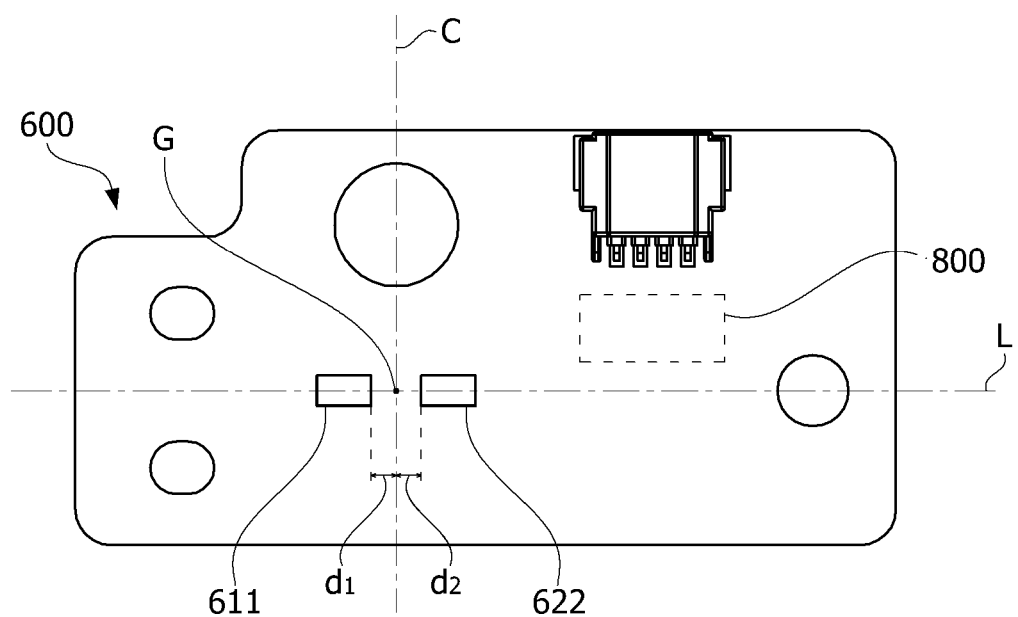
FIG. 4 illustrates a first sensor and a second sensor.

FIG. 4 is a view illustrating a first sensor and a second sensor.

Referring to FIG. 4, L of FIG. 4 is a reference line that represents the axial direction of the shaft 100, and C of FIG. 4 is a reference line that is perpendicular to L and a base for a driving origin point of the moving portion.

The first sensor 611 and the second sensor 612 may be aligned along the axial direction of the shaft 100. A driving origin point G of the moving portion 400 may be positioned between the first sensor 611 and the second sensor 612. The first sensor 611 and the second sensor 612 may be positioned at the same distance based on the driving origin point G in the axial direction of the shaft 100. That is, on the reference line L that represents the axial direction of the shaft 100, a distance d1 between the first sensor 611 and the driving origin point G and a distance d2 between the second sensor 612 and the driving origin point G may be the same.

The cover 700 may be positioned under the substrate 600. The cover 700 covers the substrate 600.

Figure 5:
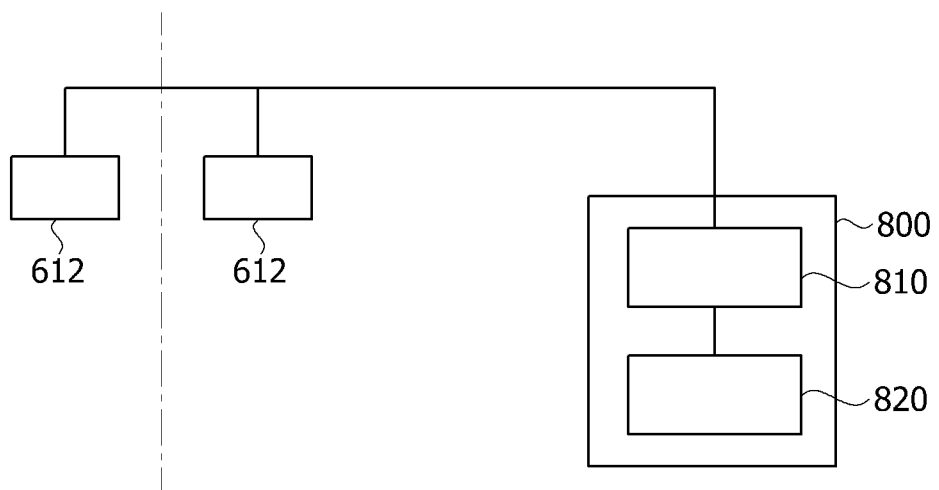
FIG. 5 illustrates a controller.

FIG. 5 illustrates a controller.

Referring to FIG. 5, the controller 800 includes a determination portion 810 and a storage portion 820 connected to the determination portion 810.

The determination portion 810 determines whether abnormality occurs in the first sensor 611 and the second sensor 612 based on measured voltage data generated in the first sensor 611 and the second sensor 612.

Reference voltage data is stored in the storage portion 820. The reference voltage data is a value obtained by converting the amount of magnetic flux change that varies in response to the position of the magnet 410 into a voltage when the sensor portion 610 is normally driven, and is stored with a table shape previously in the storage portion 820. In detail, when the moving portion 400 moves along the shaft 100, the magnet 410 moves. When the magnet 410 moves and is distant from or close to the first sensor 611 and the second sensor 612, magnetic flux sensed by the first sensor 611 and the second sensor 612 is changed. The first sensor 611 and the second sensor 612 may output the amount of magnetic flux change as a voltage. The reference voltage data corresponds to a rotational angle of a motor, and thus is an index that represents the position of the moving portion 400.

Figure 6:
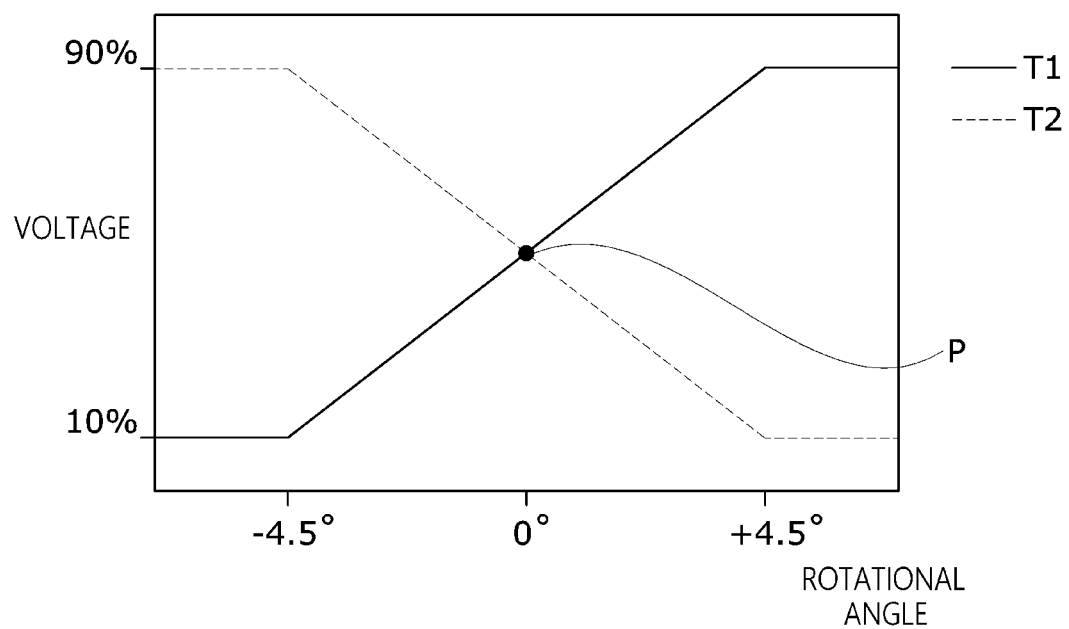
FIG. 6 is a graph showing a first signal and a second signal.

FIG. 6 is a graph showing a first signal and a second signal.

Referring to FIGS. 5 and 6, the first sensor 611 outputs a voltage value in response to the amount of magnetic flux that varies according to the movement of the magnet 410 and generates a first signal T1. In this case, the voltage may be between 0 V and 5 V. The second sensor 612 also outputs a voltage value in response to the amount of magnetic flux that varies according to the movement of the magnet 410 and generates a second signal T2. In this case, the voltage may be between 0 V and 5 V.

In this case, the first sensor 611 may be set to include an area in which a measured voltage increases linearly as the magnet 410 moves away from the first sensor 611. On the other hand, the second sensor 612 may be set to include an area in which a measured voltage decreases linearly as the magnet 410 moves away from the first sensor 611. Thus, as shown in FIG. 6, when the moving portion 400 moves, the first signal T1 and the second signal T2 are output from the first sensor 611 and the second sensor 612. A maximum value of a voltage output from the first signal T1 and the second signal T2 may be 90% of 5 V, and a minimum value thereof may be 10% of 5 V.

Referring to FIG. 6, the first signal T1 increases linearly, and the second signal T2 decreases linearly within the range of a rotational angle from −4.5° to +4.5°. At a rotational angle of 0°, the first signal T1 and the second signal T2 intersect with each other. At an intersecting point P, a voltage corresponding to the first signal T1 and a voltage corresponding to the second signal T2 are the same. An intersecting point P of the first signal T1 and the second signal T2 corresponds to the driving origin point G.

Figure 7:
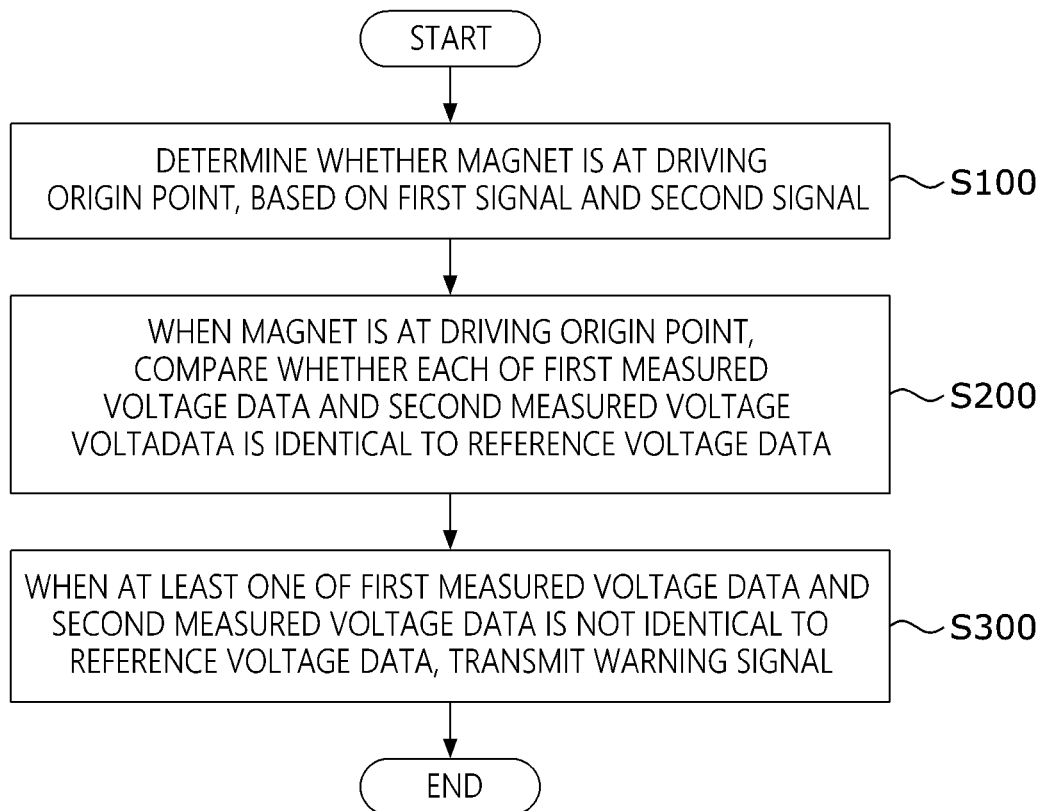
FIG. 7 illustrates an actuator control method.

FIG. 7 is a view illustrating an actuator control method.

Referring to FIGS. 3 through 7, first, the controller 800 determines whether the magnet 410 is positioned at the driving origin point G. That is, when the actuator is initially driven, the controller 800 checks whether the moving portion 400 is at the driving origin point G (S100). In detail, the controller 800 checks whether the rotational angle corresponding to the intersecting point P of the first signal T1 and the second signal T2 is 0°. When the rotational angle corresponding to the intersecting point P is not 0°, the controller 800 may control driving of the shaft 100 so that the rotational angle corresponding to the intersecting point P is 0°, thereby changing the position of the moving portion 400.

Next, when the moving portion 400 moves to a corresponding position, the determination portion 810 of the controller 800 receives first measured voltage data from the first sensor 611 and compares the first measured voltage data with reference voltage data corresponding to the corresponding position stored in the storage portion 820. Simultaneously, at the corresponding position, the determination portion 810 receives second measured voltage data from the second sensor 612 and compares the second measured voltage data with reference voltage data corresponding to the corresponding position stored in the storage portion 820 (S200).

Next, when a difference value between the first measured voltage data and the reference voltage data exceeds a reference value or a difference value between the second measured voltage data and the reference voltage data exceeds the reference value, the determination portion 810 may determine that abnormality occurs in the sensor portion 610, and may transmit a warning signal to an electronic control unit (ECU) of a vehicle (S300).

Figure 8:
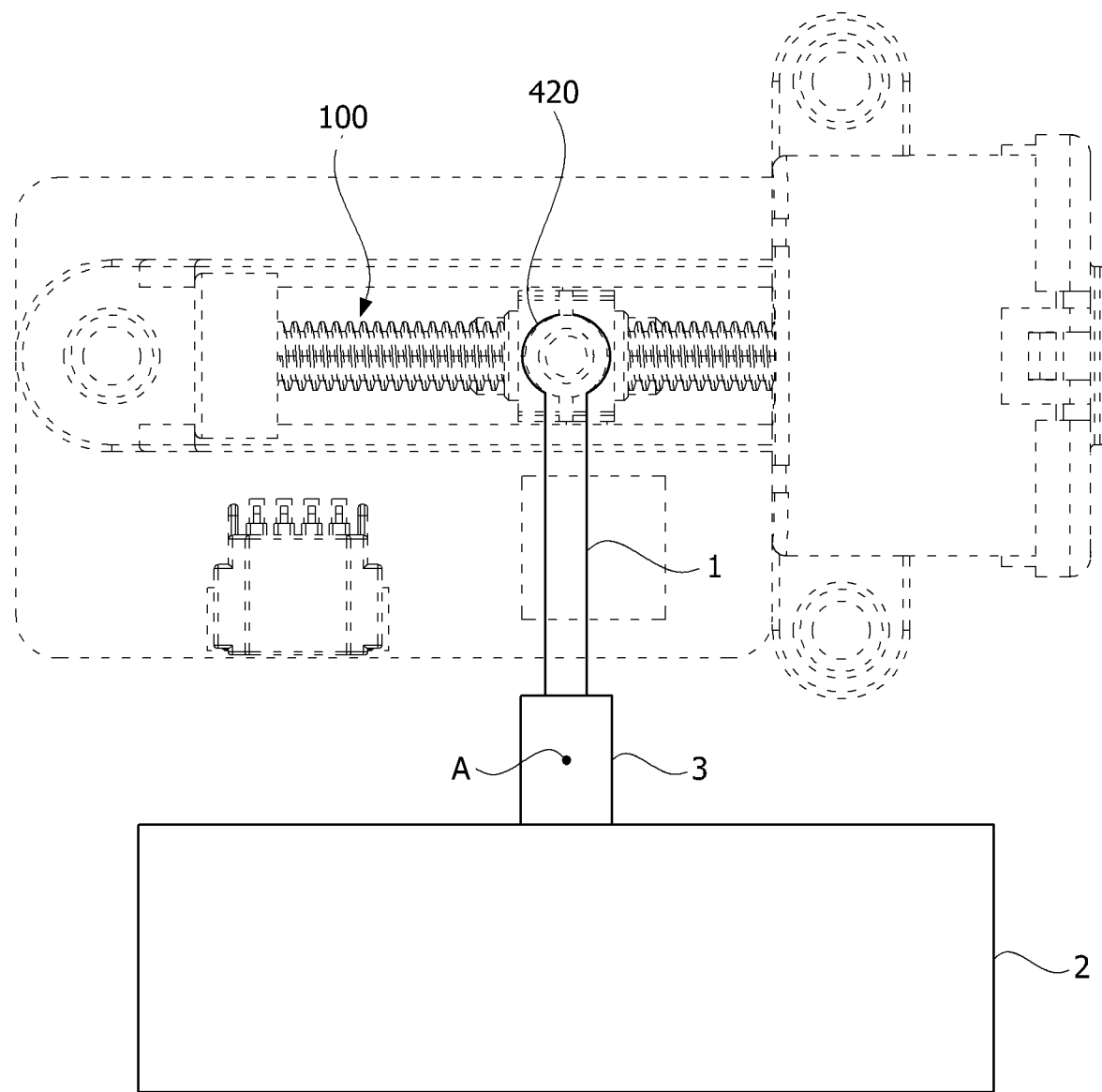
FIG. 8 illustrates a head lamp.

FIG. 8 is a view illustrating a head lamp.

Referring to FIG. 8, the moving portion 400 may be connected to a lamp portion 2 of the vehicle. In detail, a projection coupling part 1 is connected to a projection 420 of the moving portion 400. The projection coupling part 1 may be connected to a connection member 3 connected to the lamp portion 2. In this case, an axial direction of a shaft of the connection member 3 may be perpendicular to the axial direction of the shaft 100 of the actuator.

Figure 9:
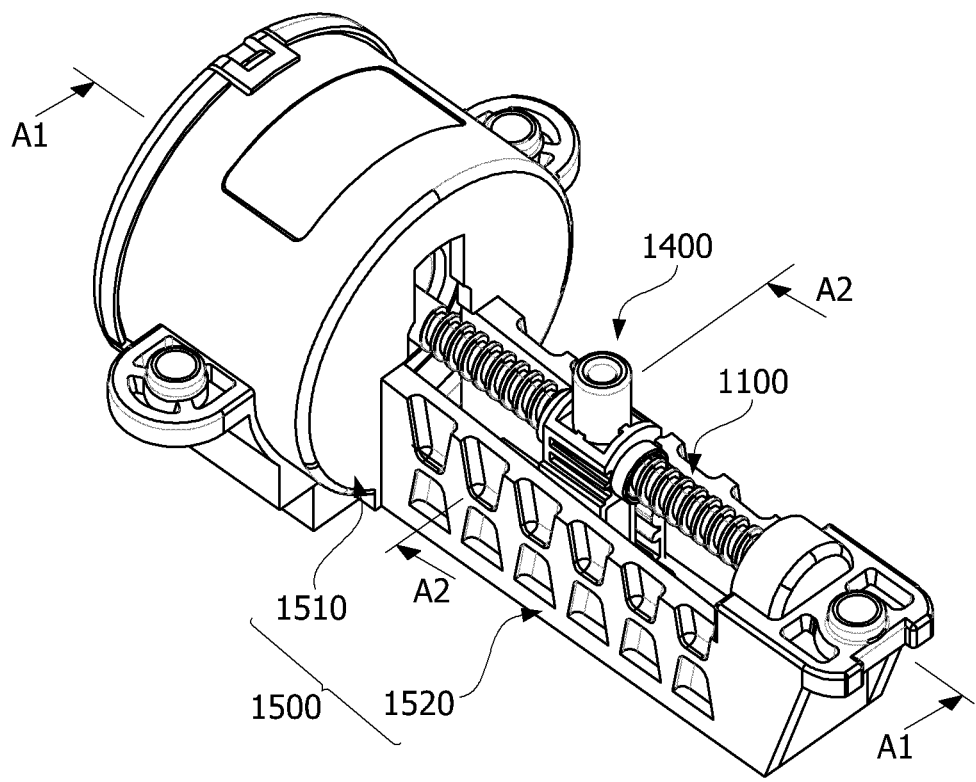
FIG. 9 is a perspective view illustrating an actuator according to another exemplary embodiment.
Figure 10:
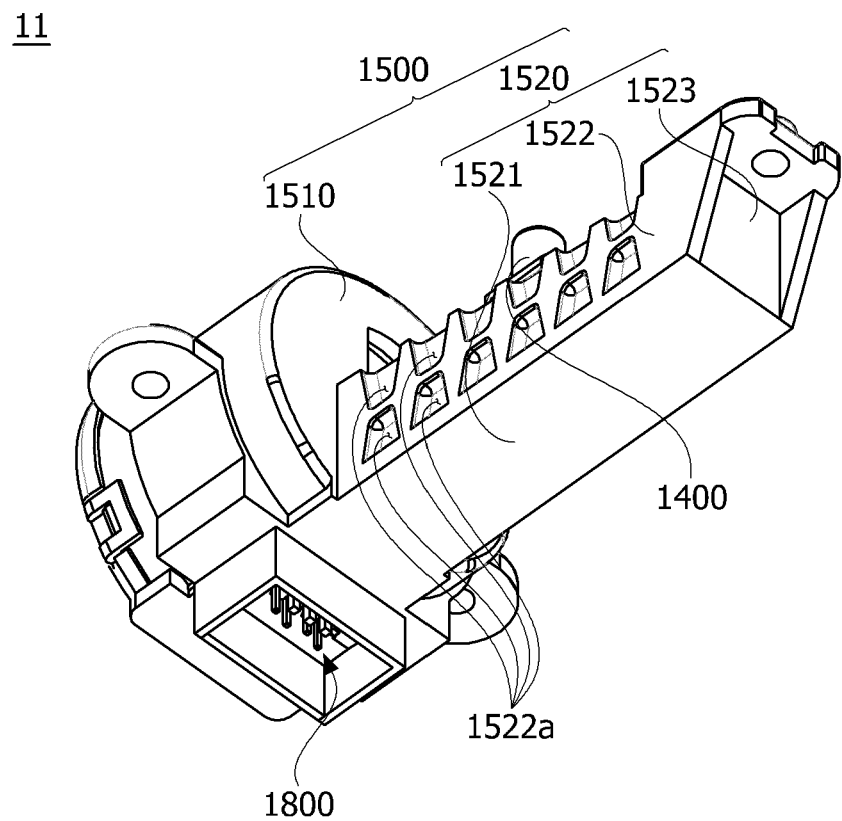
FIG. 10 is a bottom perspective view illustrating an actuator according to another exemplary embodiment.
Figure 11:
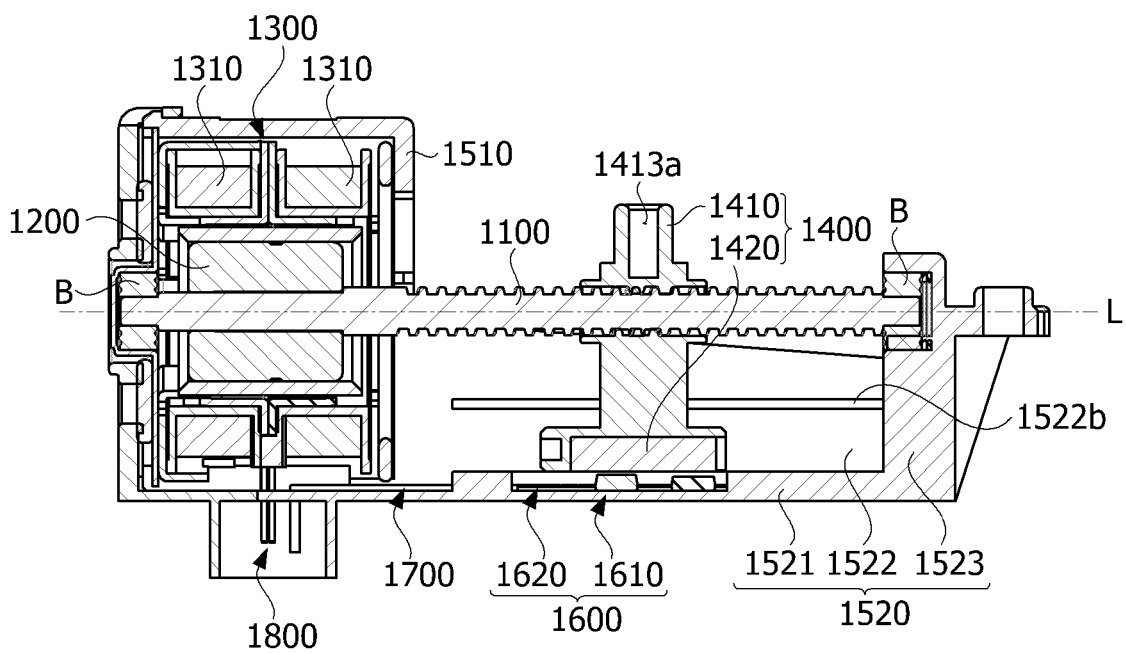
FIG. 11 is a cross-sectional view taken along a line A1-A1 of FIG. 9.
Figure 12:
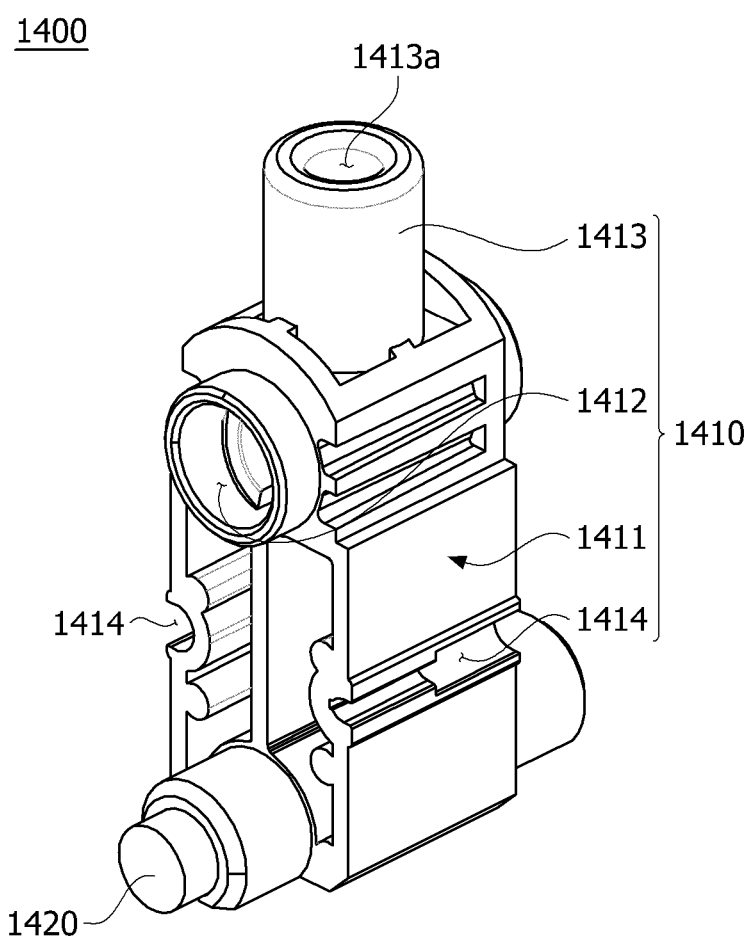
FIG. 12 illustrates a moving portion of an actuator according to another exemplary embodiment.
Figure 13:
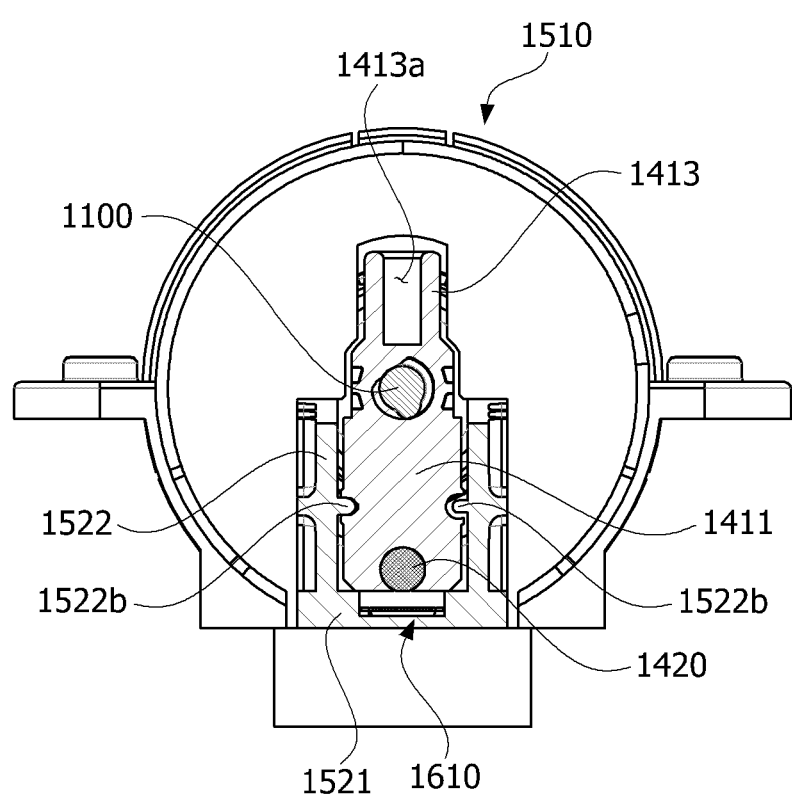
FIG. 13 is a cross-sectional view taken along a line A2-A2 of FIG. 9.
Figure 14:
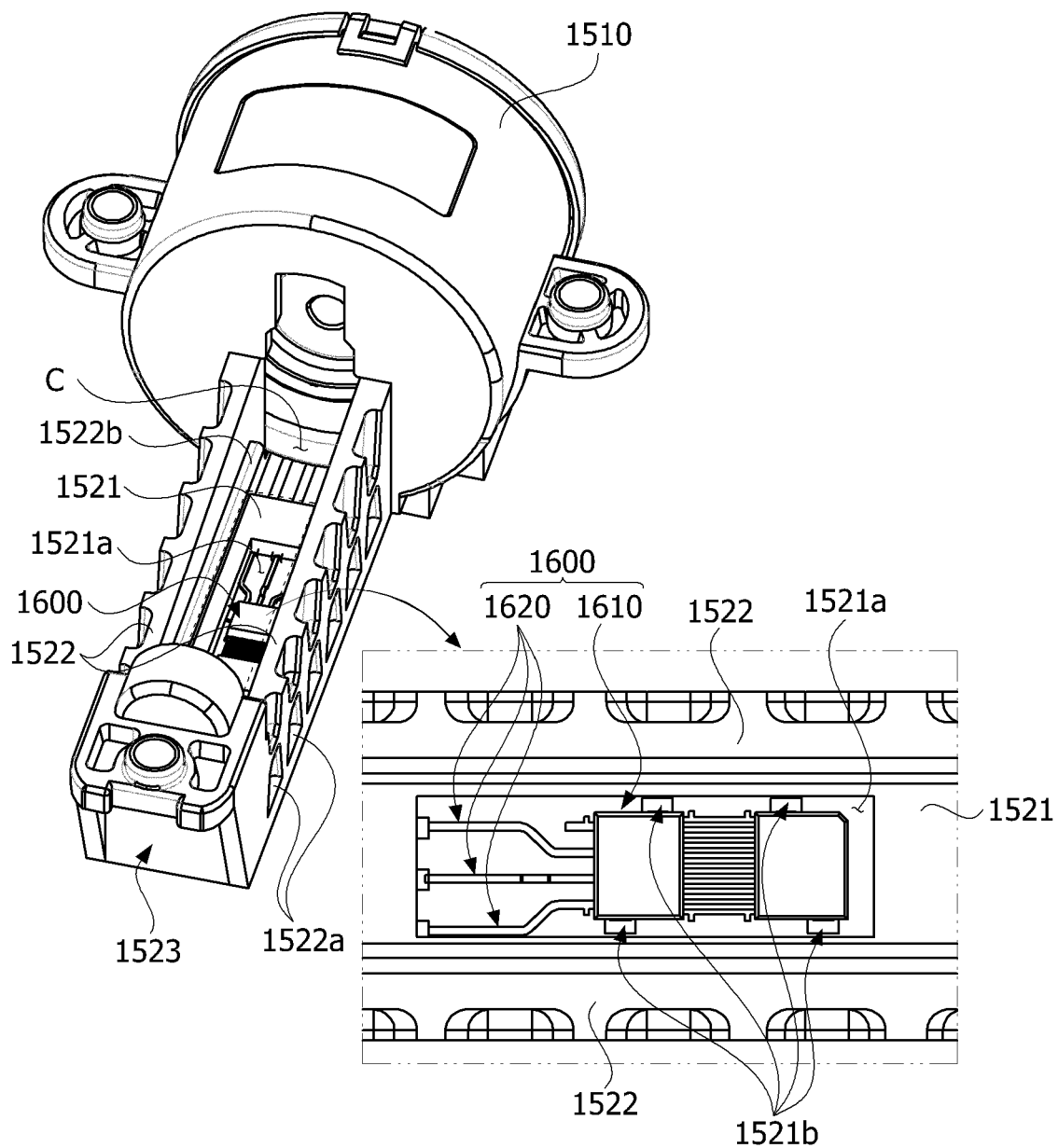
FIG. 14 illustrates a sensor portion positioned on a bottom plate of an actuator according to another exemplary embodiment.

FIG. 9 is a perspective view illustrating an actuator according to another exemplary embodiment, FIG. 10 is a bottom perspective view illustrating an actuator according to another exemplary embodiment, FIG. 11 is a cross-sectional view taken along a line A1-A1 of FIG. 9, FIG. 12 illustrates a moving portion of an actuator according to another exemplary embodiment, FIG. 13 is a cross-sectional view taken along a line A2-A2 of FIG. 9, and FIG. 14 illustrates a sensor portion positioned on a bottom plate of an actuator according to another exemplary embodiment.

Referring to FIGS. 9 through 14, an actuator 11 according to an exemplary embodiment may include a shaft 1100, a rotor 1200, a stator 1300, a moving portion 1400, a housing 1500, a sensor portion 1600, a terminal 1700, and a terminal pin 1800.

The shaft 1100 has a cylindrical shape and includes a thread on an outer circumferential surface thereof. The shaft 1100 may pass through the rotor 1200 and may be coupled to the rotor 1200. Both ends of the shaft 1100 may be rotatably supported by the bearing B, as shown in FIG. 4. Here, reference numeral L represents an axial direction of the shaft 1100.

The rotor 1200 is coupled to the shaft 1100. The rotor 1200 may be positioned inside the stator 1300. The rotor 1200 rotates due to a force generated by an electrical interaction with the stator 1300. When the rotor 1200 rotates, the shaft 1100 rotates.

The stator 1300 is positioned outside the rotor 1200. A coil 310 may be wound on the stator 1300. The coil 310 wound on the stator 1300 causes an electrical interaction and induces rotation of the rotor 1200.

The moving portion 1400 is screw-coupled to the shaft 1100. Thus, when the shaft 1100 rotates, the moving portion 1400 makes a rectilinear motion along the shaft 1100.

Referring to FIG. 11, the moving portion 1400 may include a moving portion body 1410 and a magnet 1420.

The moving portion body 1410 is screw-coupled to the shaft 1100, and as the shaft 1100 rotates, the moving portion body 1410 may make a rectilinear motion along the shaft 1100.

Referring to FIG. 12, the moving portion body 1410 may include a body 1411, a guide hole 1412 in which the shaft 1100 is positioned, a boss 1413 formed on an upper portion of the body 1411, and guide grooves 1414 formed in both sides of the body 1411.

The body 1411 may constitute an exterior of the moving portion body 1410. The body 1411 may move along the shaft 1100.

The shaft 1100 may be positioned in the guide hole 1412. A thread may be formed in the guide hole 1412 and may be screw-coupled to the shaft 1100.

The boss 1413 may protrude from the upper portion of the body 1411. A coupling groove 1413*a* may be formed in the boss 1413. One side of the coupling portion 4 may be coupled to the coupling groove 1413*a*, as shown in FIG. 8.

The guide grooves 1414 may be formed in both sides of the body 1411.

The guide grooves 1414 may be formed in the same direction as an axial (L) direction. In this case, the guide grooves 1414 may have a semi-cylindrical shape.

The magnet 1420 is positioned at a bottom end of the moving portion body 1410. The magnet 1420 may be positioned to be directed downwards.

Meanwhile, the moving portion body 1410 may include a portion to be connected to a mechanical instrument. Here, the mechanical instrument may be a head lamp mounted on a vehicle. In detail, the coupling groove 1413*a* of the moving portion body 1410 may be directly connected to a reflector of the head lamp or indirectly connected to a frame or the reflector of the head lamp via a connection member such as a link.

As the moving portion 1400 makes a rectilinear reciprocal motion, the head lamp may be leveled with swiveling and may change an irradiation direction of the lamp.

The housing 1500 may constitute an exterior of the actuator 11. Here, the housing 1500 may be formed of a synthetic resin material.

The housing 1500 may support both ends of the shaft 1100 so as to prevent a flow from occurring in the shaft 1100. In this case, both ends of the shaft 1100 are rotatably supported by the bearing B. Thus, the housing 1500 may support the bearing B.

Referring to FIGS. 9 through 13, the housing 1500 may include a body 1510 and a bracket 1520. The body 1510 and the bracket 1520 may be formed integrally. Thus, a conventional cover is omitted. Thus, an assembly tolerance may be prevented from occurring due to assembling of the cover.

The body 1510 may have a cylindrical shape. As shown in FIG. 11, the rotor 1200, the stator 1300 on which a coil 1310 is wound, and one side of the shaft 1100 positioned on an inner circumferential surface of the rotor 1200 may be positioned inside the body 1510. In this case, the bearing B may be positioned on an outer circumferential surface of one side of the shaft 1100.

The bracket 1520 may extend to protrude from one side of the body 1510.

The bracket 1520 may include a bottom plate 1521, side plates 1522 that protrude from both edges of the bottom plate 1521, and a support frame 1523 that supports the other side of the shaft 1100.

The bottom plate 1521 may have a plate shape.

The bottom plate 1521 may protrude in the axial (L) direction of the shaft 1100 from one side of the body 1510. The bottom plate 1521 may be formed integrally with the body 1510. In this case, the bottom plate 1521 is disposed to be apart from the shaft 1100.

As shown in FIG. 14, a groove 1521*a* may be formed in one surface of the bottom plate 1521. The sensor portion 1600 may be positioned in the groove 1521*a*. That is, the groove 1521*a* may guide arrangement of the sensor portion 1600 so as to minimize the occurrence of an assembly tolerance during assembling of the sensor portion 1600.

Also, guide portions 1521*b* may be further positioned in the groove 1521*a* and may protrude upwards. Thus, the guide portions 1521*b* allows the sensor portion 1600 be positioned at a preset position. Thus, the guide portions 1521*b* may minimize the assembly tolerance of the sensor portion 1600.

Because the sensor portion 1600 is fixed by the guide portions 1521*b*, the guide portions 1521*b* may prevent a flow of the sensor portion 1600.

The side plates 1522 may be formed to protrude from both edges of the bottom plate 1521 upwards. In this case, one side of each of the side plates 1522 is connected to one side of the body 1510, and the other side thereof is connected to the support frame 1523.

A plurality of grooves 1522*a* for reducing mass of the actuator may be formed in an outer surface of each of the side plates 1522. As shown in FIGS. 10 and 14, the plurality of grooves 1522*a* for reducing mass of the actuator may have a trapezoidal or reversed trapezoidal shape.

Meanwhile, guide projections 1522*b* may be positioned on an inner surface of the side plates 1522.

The guide projections 1522*b* may be detached from/assembled with the guide grooves 1414 formed in the moving portion body 1410, as shown in FIG. 13. Thus, the guide projections 1522*b* may guide movement of the moving portion 1400.

Here, the guide projections 1522*b* may be formed in the same direction as the axial (L) direction. In this case, the guide projections 1522*b* may have a semi-cylindrical shape.

The support frame 1523 may be apart from the body 1510 so as to face each other. The support frame 1523 may protrude from edges of the bottom plate 1521 upwards. Thus, the body 1510 may be positioned at one side of the bottom plate 1521, and the support frame 1523 may be positioned at the other side of the bottom plate 1521.

The support frame 1523 may support the other side of the shaft 1100. That is, the bearing B may be positioned on the support frame 1523 so as to support the other side of the shaft 1100.

Meanwhile, a cavity C may be formed by the body 1510 and the bracket 1520 positioned at one side of the body 1510, as shown in FIG. 12. The magnet 1420 may be positioned in the cavity C.

Thus, since the magnet 1420 and the sensor portion 1600 are surrounded by the housing 1500 provided as an injection molding structure, the shielding performance of electromagnetic wave noise may be further improved by the housing 1500 formed of a synthetic resin material.

The sensor portion 1600 may be positioned on the bottom plate 1521.

Preferably, the sensor portion 1600 may be positioned in the groove 1521a of the bottom plate 1521. In this case, the sensor portion 1600 may be thermally-fused into the groove 1521a of the bottom plate 1521 and fixed thereto.

Thus, the sensor portion 1600 is formed integrally with the bottom plate 1521 due to thermal fusion so that an assembly tolerance may be minimized. Also, because the actuator 11 uses the sensor portion 1600 thermally-fused into the bottom plate 1521, a conventional assembling process of assembling a substrate and a cover may be omitted. Thus, the actuator 11 may reduce production costs.

The sensor portion 1600 may face the magnet 1420 so as to sense the amount of magnetic flux change due to the magnet 1420.

The sensor portion 1600 may include a hall-IC 1610 and a lead frame 1620.

The hall-IC 1610 senses the amount of magnetic flux change due to the magnet 1420. The hall-IC 1610 may change a change of a magnetic field into a voltage due to a hall effect. Here, a DMP hall-IC having an over-molded capacitor may be used as the hall-IC 1610. Thus, the hall-IC 1610 may prevent contamination by foreign substances due to over-molding.

That is, the hall-IC 1610 may sense the amount of magnetic flux change according to the position of the magnet 1420 and may output a voltage in response to the sensed amount of magnetic flux change.

For example, when the moving portion 1400 moves along the shaft 1100, the magnet 1420 moves. As the magnet 1420 moves, when the magnet 1420 moves away from or close to the hall-IC 1610, magnetic flux sensed by the hall-IC 1610 varies. Thus, the hall-IC 1610 may output the amount of magnetic flux change as a voltage. This voltage data corresponds to the rotational angle of the rotor 1200 and thus is an index that indicates the position of the moving portion 1400.

The lead frame 1620 may be positioned at one side of the hall-IC 1610.

As shown in FIG. 14, three lead frames 1620 may protrude from one side of the hall-IC 1610. Thus, power may be input to the hall-IC 1610 via one of the lead frames 1620. Another one of the lead frames 1620 may serve as an output. The other one of the lead frames 1620 may serve as a ground.

The terminal 1700 may be electrically connected to the lead frames 1620. Thus, three terminals 1700 may be provided, as shown in FIG. 14. Here, the terminals 1700 may be provided as electric steel plates.

Meanwhile, the terminals 1700 may be positioned on the bottom plate 1521 using a press fit or insert injection method. One side of each of the terminals 1700 may be connected to each of the lead frames 1620 through welding using laser.

The other side of each of the terminals 1700 may have a cylindrical shape.

Thus, the other side of each of the terminals 1700 may be used as the terminal pin 1800. Here, the terminal pin 1800 may be provided as an electrical connection member to be directly connected to an external connector (not shown).

A plurality of terminal pins 1800 may be connected to the connector.

As shown in FIG. 10, seven terminal pins 1800 may be provided.

Four of the terminal pins 1800 may be electrically connected to the coil 1310. Three of the terminal pins 1800 may be the other sides of the terminals 1700 having a cylindrical shape.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An actuator comprising:
a shaft;
a rotor surrounding the shaft;
a stator arranged outside the rotor;
a moving portion coupled to the shaft;
a housing that holds the shaft; and
a substrate that is arranged on the housing and comprises a sensor portion for sensing the position of the moving portion,
wherein the moving portion comprises a magnet, the sensor portion comprises a first sensor and a second sensor for sensing the amount of magnetic flux change according to the position of the magnet, the first sensor generates a first signal including an area in which a measured voltage increases as the magnet moves away from the first sensor, and the second sensor generates a second signal including an area in which the measured voltage decreases as the magnet moves away from the second sensor.

2. The actuator of claim 1, further comprising a controller for controlling movement of the moving portion, wherein the controller comprises a determination portion that determines whether the magnet is positioned at a driving origin point based on the first signal and the second signal.

3. The actuator of claim 1, further comprising a controller connected to the first sensor and the second sensor, wherein the controller comprises a storage portion for storing reference voltage data corresponding to the amount of magnetic flux change according to the position of the magnet and a determination portion that compares first measured voltage data measured by the first sensor and second measured voltage data measured by the second sensor with the reference voltage data at the corresponding position of the magnet.

4. The actuator of claim 3, wherein the determination portion generates a warning signal when a difference value between the first measured voltage data and the reference voltage data exceeds a reference value or a difference value between the second measured voltage data and the reference voltage data exceeds the reference value.

5. A head lamp comprising:
an actuator; and
a lamp portion connected to the actuator,
wherein the actuator comprises;
a shaft;
a rotor surrounding the shaft;
a stator arranged outside the rotor;
a moving portion coupled to the shaft;
a housing that holds the shaft; and
a substrate that is arranged under the housing and comprises a sensor portion for sensing the position of the moving portion, and
wherein the moving portion comprises a magnet, the sensor portion comprises a first sensor and a second sensor for sensing the amount of magnetic flux change according to the position of the magnet, the first sensor generates a first signal including an area in which a measured voltage increases as the magnet moves away from the first sensor, and the second sensor generates a second signal including an area in which the measured voltage decreases as the magnet moves away from the second sensor.

6. An actuator comprising:

a shaft;

a rotor arranged outside the shaft;

a stator, which is arranged outside the rotor;

a moving portion coupled to the shaft and moving along the shaft;

a housing that holds the shaft; and a sensor portion arranged on the housing and sensing the position of the moving portion, wherein the sensor portion comprises a hall-integrated circuit (IC) for sensing the position of the moving portion and a lead frame arranged at one side of the hall IC, further comprising a terminal is electrically connected to an external connector, wherein the lead frame is electrically connected to the terminal.

7. The actuator of claim 6, wherein the housing comprises a body; and a bracket that extends to protrude from one side of the body, and the rotor, the stator, and one side of the shaft are positioned inside the body, and the other side of the shaft is supported by the bracket, and the bracket comprises a bottom plate, side plates that protrude from the bottom plate and a support frame supporting the other side of the shaft, and the housing and the bracket are integrally formed.

8. The actuator of claim 7, further comprising a terminal having one side connected to the lead frame, wherein the terminal is positioned on the bottom plate using a press fit or insert injection method.

9. The actuator of claim 7, wherein guide projections are further arranged on an inner surface of the side plates, and the guide projections are detached from/assembled with guide grooves of the moving portion and guide movement of the moving portion.

10. A head lamp comprising:

an actuator; and a lamp portion connected to the actuator, wherein the actuator comprises;

a shaft;

a rotor arranged outside the shaft;

a stator, which is arranged outside the rotor;

a moving portion coupled to the shaft and moving along the shaft;

a housing that holds the shaft; and a sensor portion arranged on the housing and sensing the position of the moving portion, and wherein the sensor portion comprises a hall-integrated circuit (IC) for sensing the position of the moving portion and a lead frame arranged at one side of the hall IC, further comprising a terminal is electrically connected to an external connector, wherein the lead frame is electrically connected to the terminal.

\* \* \* \* \*